(12) United States Patent
Branch et al.

(10) Patent No.: US 10,510,032 B2
(45) Date of Patent: Dec. 17, 2019

(54) AUTOMATED CONFIGURATION DATA COLLECTION FOR BUSINESS APPLICATIONS USING FEEDBACK

(71) Applicant: International Business Machines Corporation, Armonk, NY (US)

(72) Inventors: Joel W. Branch, Hamden, CT (US); Karin Murthy, Elmsford, NY (US); Larisa Shwartz, Scarsdale, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 848 days.

(21) Appl. No.: 14/486,328

(22) Filed: Sep. 15, 2014

(65) Prior Publication Data
US 2016/0078379 A1    Mar. 17, 2016

(51) Int. Cl.
*G06Q 10/06*    (2012.01)
(52) U.S. Cl.
CPC ....... *G06Q 10/0637* (2013.01); *G06Q 10/067* (2013.01)
(58) Field of Classification Search
None
See application file for complete search history.

(56) References Cited

U.S. PATENT DOCUMENTS

| 8,595,739 | B2 | 11/2013 | Jethani | |
| 9,367,823 | B1* | 6/2016 | Mihalik | G06F 17/3053 |
| 2009/0037481 | A1 | 2/2009 | Baker | |
| 2011/0252382 | A1 | 10/2011 | Bhaskaran | |
| 2011/0258215 | A1* | 10/2011 | Naik | G06Q 10/06 707/769 |
| 2011/0270861 | A1* | 11/2011 | Arshavsky | G06F 17/30448 707/759 |
| 2012/0197902 | A1* | 8/2012 | Bhagwan | G06F 17/30899 707/748 |
| 2014/0136548 | A1* | 5/2014 | Lee | G06F 17/3053 707/748 |
| 2015/0154501 | A1* | 6/2015 | Boddhu | G06F 17/2765 706/52 |
| 2015/0161257 | A1* | 6/2015 | Shivaswamy | G06F 17/30864 707/709 |

FOREIGN PATENT DOCUMENTS

WO    2011044681    4/2011

* cited by examiner

*Primary Examiner* — Eric W Stamber
*Assistant Examiner* — Alan Torrico-Lopez
(74) *Attorney, Agent, or Firm* — Kristofer Haggerty; Otterstedt, Wallace & Kammer, LLP

(57) ABSTRACT

A data collection method including collecting, by a configuration collector manager, configuration data, including configuration properties, from a plurality of data sources, creating, by a model discovery component, a business application model using the configuration data collected by the configuration collector manager, a collecting, from a business application model analysis user interface, edits and confirmations associated with the business application model, and a analyzing, by a feedback analyzer component, the edits and confirmations associated with the business application model and prioritizing the configuration properties based on the data sources and the edits and confirmations associated with the business application model.

14 Claims, 8 Drawing Sheets

US 10,510,032 B2

AUTOMATED CONFIGURATION DATA COLLECTION FOR BUSINESS APPLICATIONS USING FEEDBACK

BACKGROUND

The present disclosure relates to methods for defining specific business application models, and more particularly to a method for automating the selection of information technology (IT) components and other data sources to scan and/or analyze for collecting configuration data to define specific business application models.

In the context of IT asset management, there is a need to map IT components (e.g., servers, network switches, etc.) to business applications (e.g., payroll processing application, order-to-cash application) for purposes such as Configuration Management Database (CMDB) maintenance. The mapping of IT components to business applications is typically done by collecting configuration data from IT infrastructure components and documentation, for example by scanning IT infrastructure components and documents (e.g., change request documents). The configuration data can contain clues (e.g., name of a hosted database, server and business application mentioned in same incident ticket, etc.) that link IT components to business applications. The scanning is typically performed in a non-prioritized periodic fashion that wastes network bandwidth and processor cycles, particularly for tracking single business applications.

BRIEF SUMMARY

According to an exemplary embodiment of the present invention, a data collection method including collecting, by a configuration collector manager, configuration data, including configuration properties, from a plurality of data sources, creating, by a model discovery component, a business application model using the configuration data collected by the configuration collector manager, a collecting, from a business application model analysis user interface, edits and confirmations associated with the business application model, and a analyzing, by a feedback analyzer component, the edits and confirmations associated with the business application model and prioritizing the configuration properties based on the data sources and the edits and confirmations associated with the business application model.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

According to an exemplary embodiment of the present invention, a system and method are configured for automating the selection of IT components and data sources. Selected IT components and data sources are scanned and/or analyzed (e.g., using a tool such as the IBM Tivoli Application Dependency Discovery Manager (TADDM)) for configuration data defining specific business application models. The selection of IT components is guided by feedback and properties related to the business application models.

Figure 1:
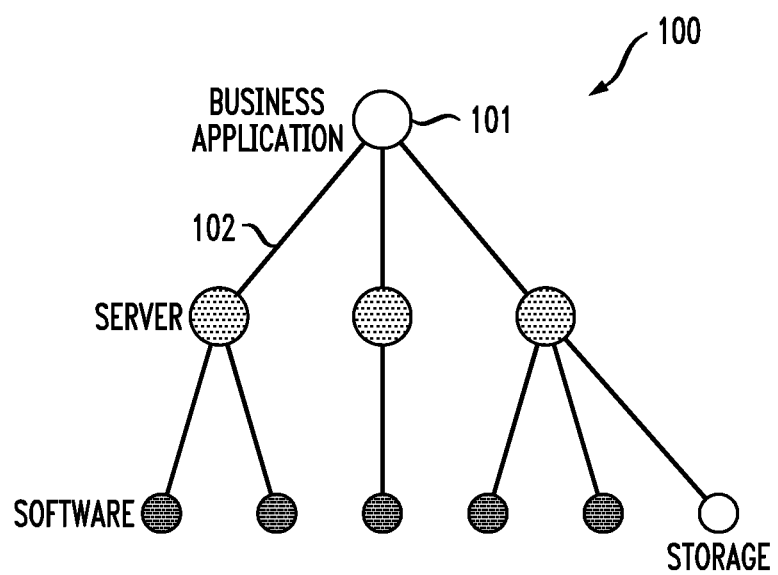
FIG. 1 shows an exemplary graphical business application model according to an exemplary embodiment of the present invention.

According to an exemplary embodiment of the present invention, the feedback is obtained from users, such as subject matter experts, using graphical representations of the business application models (e.g., see 100, FIG. 1) to review and edit the corresponding business application models. The business application models are typically stored in CMDB as a representation of a business application. The feedback can include the deletion of model elements, the confirmation of model elements, etc.

The business application model elements include, for example, vertices (e.g., 101) and links (e.g., 102) in a graph-based representation of the business application model. According to an exemplary embodiment of the present invention, the vertices and links, which remain after editing, implicitly denote the relative importance of IT components (including the data sources and algorithms supporting their discovery) to the corresponding business application. Less important components, e.g., those that are deleted as a result of user feedback, are scanned less often then relatively more important components. By adjusting the frequency of scanning, bandwidth and other resources can be conserved.

According to an exemplary embodiment of the present invention, patterns in the feedback and patterns and/or properties of the users themselves (e.g., users' expertise, organizational membership, or social network relationships) are analyzed to provide information used in managing and automating IT configuration collection and/or analysis.

Figure 2:
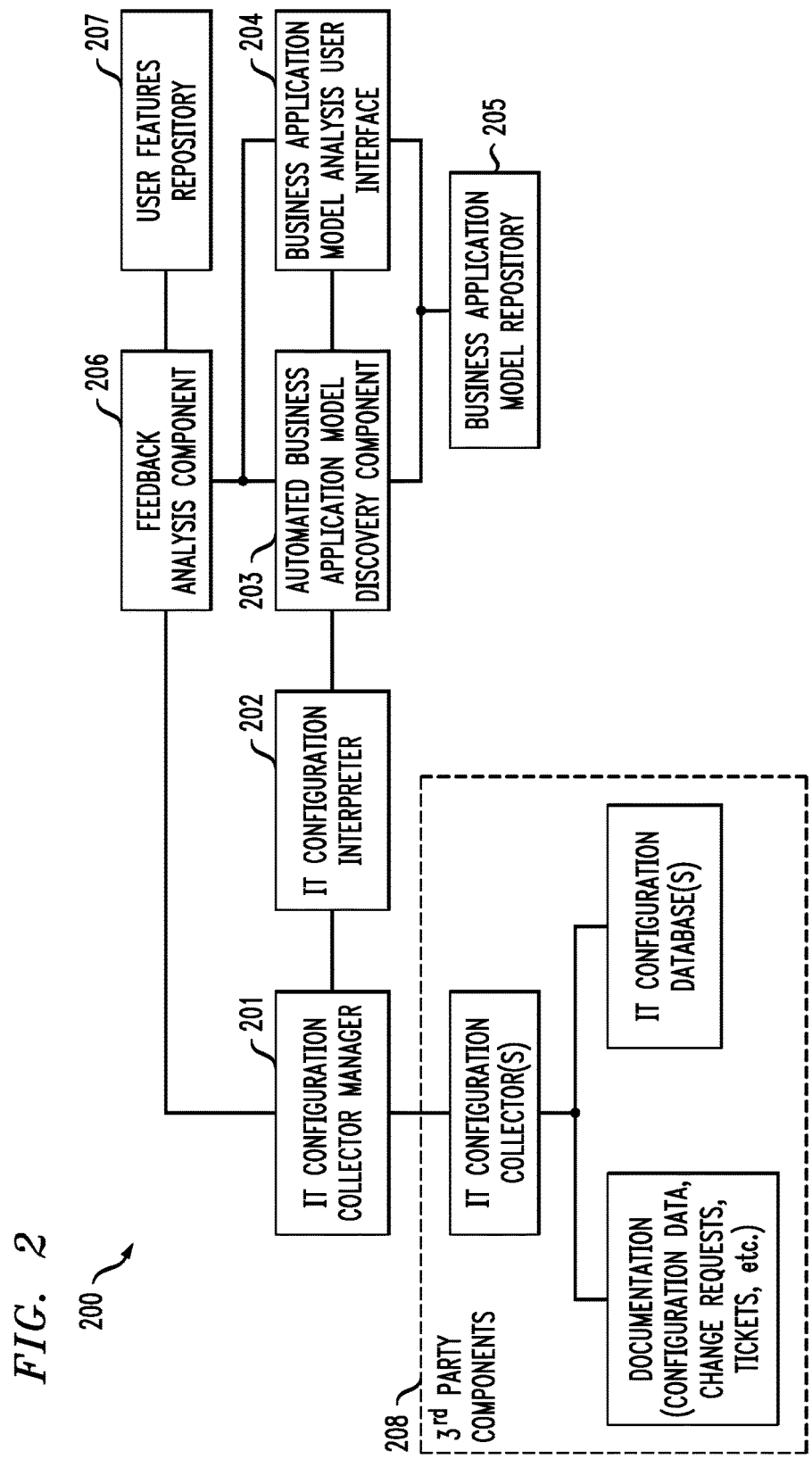
FIG. 2 is a system diagram according to an exemplary embodiment of the present invention.

FIG. 2 is a system diagram of a system 200 for facilitating and automating business application model composition and IT configuration analysis. The system 200 includes an IT configuration collector manager 201, an IT configuration interpreter 202 and an automated business application model discovery component 203. The system 200 further includes a business application model analysis user interface 204, a business application model repository 205, a feedback analysis component 206 and a user features repository 207.

In one or more exemplary embodiments, the IT configuration collector manager 201 sends instructions to configuration collection components 208 (e.g., TADDM and scripts) to adjust data collection (e.g., how to collect data and what data to collect). For example, for a given business application, a script is instructed to collect only login data, overriding at least one command to collect a default set of configuration data. In one or more exemplary embodiments, the configuration collection components 208 are $3^{rd}$ party components.

The IT configuration interpreter 202 maps configuration properties from a data source to configuration properties internal to the system 200. Initial mappings can be provided by an external source, e.g., a user, and stored over time.

The automated business application model discovery component 203 creates business application models using IT configuration data collected by the IT configuration collector manager 201. In one or more embodiments of the present invention, a business application model is represented as a graph, including vertices representing configuration items (CIs), with CI properties, and edges representing relationships between the CIs. For example, an edge between an operating system CI and a server CI can be interpreted as an operating system installed on a server.

The business application model analysis user interface 204 enables the user to edit and confirm properties of the business application model. For example, the user can confirm the existence of a link or a vertex, or change a property of a given vertex. Examples of such an interface include an interactive visualization of a business application model, and a survey with questions about properties of the business application model. In the context of a survey, users can be referred to as "respondents."

The business application model repository 205 stores business application models for the system, together with edits and confirmations associated with the models. Mappings between application models and data sources, as well as algorithms used to discover and/or build the models, are stored in this component. In one or more embodiments of the present invention, the algorithms are used by the automated business application model discovery components.

The feedback analysis component 206 analyzes edits and confirmations to the business application model properties to determine what configuration data sources and application discovery algorithms have higher values in contributing information to the model. The mappings stored in the business application model repository component are used to determine what underlying data sources and algorithms contributed to the properties the users are providing feedback upon. This component also analyzes the properties of users to determine what prominent features of users classify them as knowledgeable about a given business application model. Users' edits and confirmations are collected from the business application model analysis interface. Exemplary analysis techniques employed by this component include machine-learning techniques such as clustering and supervised classification.

The user features repository 207 stores features of respondents that are used by the feedback analysis component 206. Such features may include the organizational properties of a user, e.g., to what manager does the user report too. The user features repository 207 can include location properties such as a physical location of the user. The user features repository 207 can include workplace social network properties such as what projects and expertise group the user belongs to. Features can also include other identifying information, such as the IP address(es) of workstation(s) the user accesses in performing work.

Figure 3:
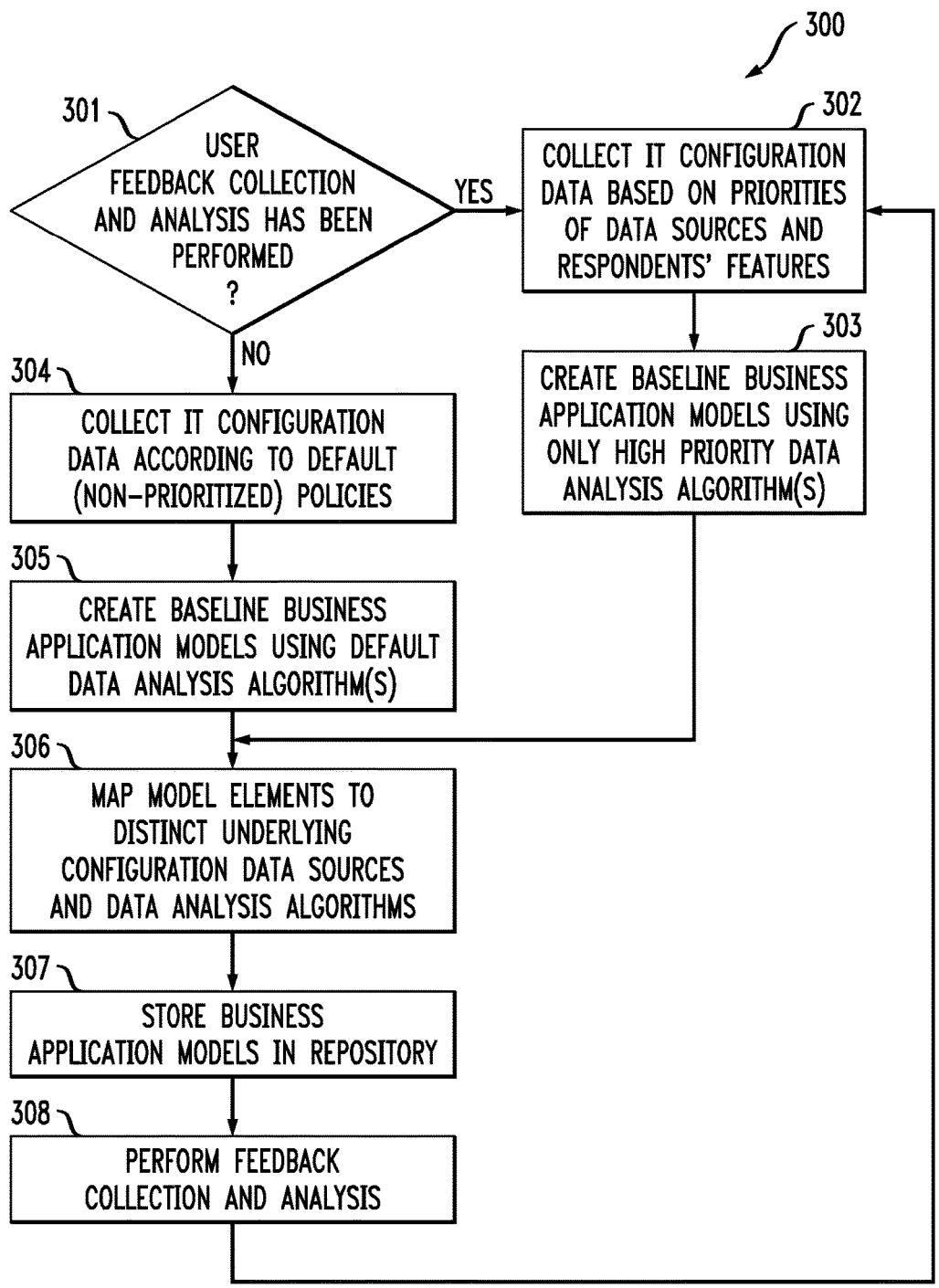
FIG. 3 is a flow diagram of a business application model creation method according to an exemplary embodiment of the present invention.

FIG. 3 is a flow diagram 300 for a business application model creation method. At block 301, the availability of user feedback is evaluated. If feedback is available, at block 302, CI information for CI types of interest from all available structured data sources is extracted. Using extracted CI information, baseline business application models are created using data analysis programs (e.g., higher priority data analysis programs) at block 303.

If feedback is not available (at block 301), at block 304, information is consolidated from the data sources. For example, default entity-resolution techniques can be used to determine unique CI elements. In another example, the reliability of a source can be used in the consolidation. The consolidation results in a compilation of information for all unique CI elements (e.g., business applications, hosts, databases). At block 305, relationships are discovered to create baseline business application models. The relationships are expressed in structured data sources (e.g. information about an entry host e_1 and business application b_1 appears in the same row of a table). Furthermore, relationships established by unstructured data (e.g. incident ticket description and resolution, problem descriptions, descriptions of work performed, server build descriptions) are discovered. This discovery can use text analytics such as exacting matching (e.g., to identify hostnames, database names), fuzzy matching (e.g., to identify application names) and rule-based matching (e.g., to identify application codes).

Figure 4:
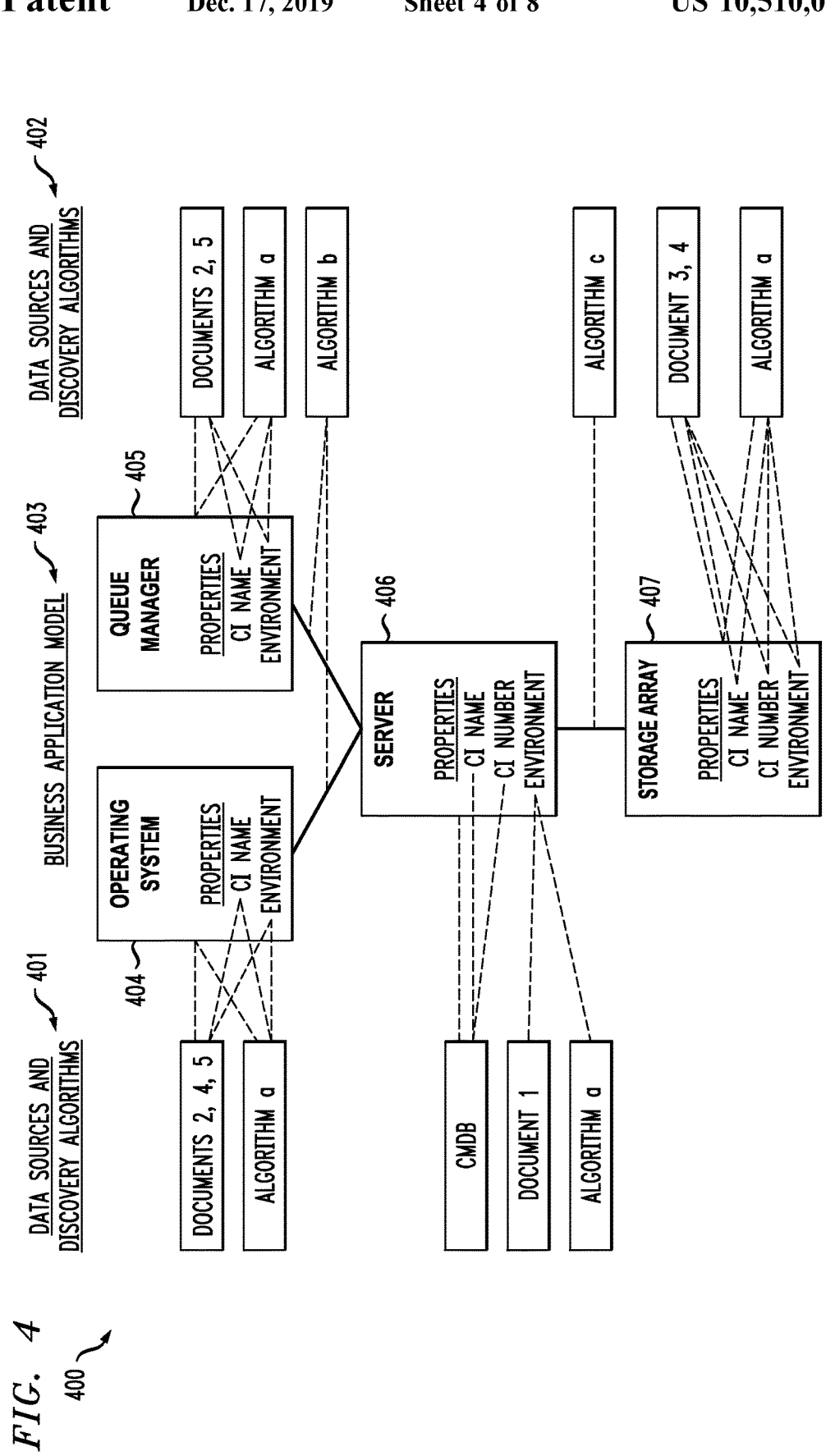
FIG. 4 illustrates an exemplary business application model mapping according to FIG. 3.

At block 306, model elements from blocks 303 and 305 are mapped to distinct underlying configuration data sources and data analysis algorithms that were used to create the business application models. FIG. 4 illustrates an exemplary mapping 400 according to block 305, wherein data sources and discovery algorithms (401, 402) are mapped to a business application model 403. As shown in FIG. 4, a business application model can include properties of component operating systems 404, queue managers 405, servers 406, storage systems 407, etc.

Referring again to FIG. 3, the business application models are stored in a repository at block 307, from which the business application models can be accessed for feedback collection and analysis at block 308.

Figure 5:
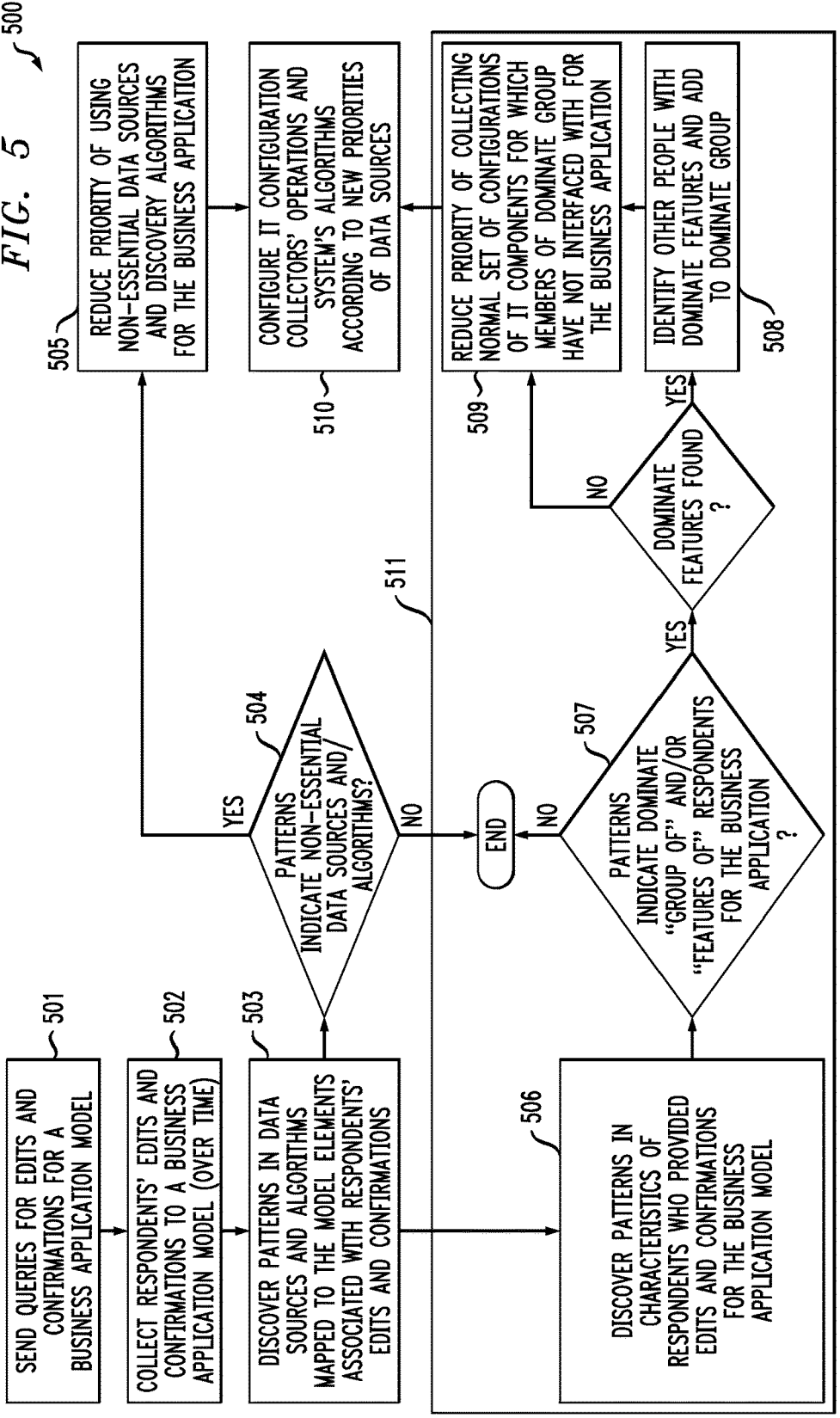
FIG. 5 is a flow diagram of a feedback collection and analysis method according to an exemplary embodiment of the present invention.

FIG. 5 is a flow diagram of a feedback collection and analysis method 500 according to an exemplary embodiment of the present invention. According to an embodiment of the present invention, the feedback collection and analysis method 500 includes sending queries for edits and confirmations related to a business application model at block 501. In response to the query, users return edits and confirmations over time at block 502. Given the edits and confirmations, patterns are discovered at block 503. The patterns can be extracted from the data sources and algorithms mapped to the business application model elements. At block 504 the method determines whether the patterns are indicative of lower priority data sources and/or algorithms using data pattern analysis techniques and decision thresholds. For lower priority data sources and/or algorithms, the method reduces the priority of using such data sources and discovery algorithms at latter points in time for the business application.

At block 511 in FIG. 5, method steps are performed to take into account user properties. User features can include at least one of the following properties: operating system competency or competencies, organizational membership(s), and incident ticket properties for those tickets in which the user participated, e.g., as a resolver. According to FIG. 5, similar business applications are grouped, e.g., via data clustering techniques, and users are classified. At block 506, the method includes discovering patterns in characteristics of users who provided the edits and confirmations for the business application model. At block 507, the method determines whether the patterns are indicative of dominant groups and/or features of users for the business application using data pattern analysis techniques and decision thresholds. In the case dominant features are found, the method includes identifying users with dominant features and adding these users to a dominant group at block 508. At block 509, the method reduces the priority of collecting normal set configurations of IT components for which users (e.g., members) of a dominant group have not interfaced with IT components associated with the business application. Evidence of a user interfacing with an IT component includes, but is not limited to, entries in login records (of the component) associated with the user.

In one or more exemplary embodiments, at block 510, system output is used to configure (or re-configure) the behavior of IT configuration data collectors based on the priorities of data sources, data sets, and/or algorithms as described in connection with blocks 505 and 509. In one exemplary embodiment, the output is used by the system to configure (or re-configure) itself to employ data analysis algorithms (e.g., those described in connection with block 305) differently. As an example, such IT data collectors can be configured to collect reduced-priority data sources at a less frequent rate as compared to other data sources. As another example, if a dominant set of users is identified for a given business application, then an IT configuration collector can be configured to first confirm that such a user has frequently logged into an IT component, and then only collect further configuration data from that component if such a user was confirmed to have logged into the component frequently. In yet another example, the system can use specific data analysis algorithms less frequently for a given business application if the priority of the algorithm has been reduced. The actions represented by block 510 can be executed automatically by the method and system, e.g., by using software or hardware interfaces. Alternatively, the method and system can send a message to at least one human operator (e.g., using some electronic messaging system) alerting the operator(s) that changes must be made to IT configuration collection components or the system itself. It should be understood that these and other applications of the system output are contemplated, and that the specific examples provided herein are not intended to be limiting.

According to an exemplary embodiment of the present invention, in grouping similar business applications, dominant/dependent feature patterns are discovered among users (e.g., query respondents) for a given business application (see blocks 506-507) by comparing features among a broad set of users (e.g., users who support different types of applications) using a data set including samples from different clusters, if they exist. For example, the following objective function represents a K-means clustering problem:

$$\min(J) = \Sigma_{n=1}^{N} \Sigma_{k=1}^{K} r_{nk} \|x_n - \mu_k\|^2,$$

where the data points $x_n$ represent business applications. Here, the features can include, but are not limited to, location coordinates for the business application and the presence of statistically important keywords in a business applications name. As an example, for the K-means clustering approach, a list of keywords can be created where each keyword maps to a data property, and the property can be set to 1 if the business application name contains the word; it is set to 0 otherwise.

In classifying users, samples of the users and their features are selected from different business application clusters, including a cluster for a business application in question. Given this selection, the classification problem can be represented by a single K-class discriminant comprising K linear functions $$y_k(x) = w_k^T x + w_{k0},$$

where k=1, . . . , K, $w_k^T$ is a weight vector and $w_{k0}$ is a bias for the class $C_k$ (i.e., business application), vector x represents a single user and its respective features, and x is assigned to business application $C_k$ if $y_k(x) > y_j(x)$ for all $j \neq k$. Various techniques, such as least-squares, can be used to solve the classification problem.

Dependent variable analysis, cross-fold validation techniques, and comparison of classification/error rates to a prescribed threshold can be used to determine dominant features and essential feature values of users to a specific business application (for example, at block 506). Once features are known, they can be used to identify a (possibly) larger set of users likely associated with a business application (e.g., see block 508).

The data source analysis can prioritize the data sources and algorithms by importance by mapping user edits and confirmation to underlying data sources and discovery algorithms. For example, a scoring method can be used in which a priority score is initialized to 0 for each data source and discovery algorithm. For every $x_1$ users' confirmation of a CI element (e.g., vertex or link) or property, increase a score of the mapped data source and algorithm by 1. For every $x_2$ users' edit of a CI property, decrease a score of a mapped algorithm by 0.5. For every $x_3$ deletion of a CI element, decrease score of mapped data source and algorithm by 1. Thresholds can be used by the IT configuration collection manager to make a decision to instruct $3^{rd}$ party configuration collectors to scan or not scan a particular IT component (represented by CI's in the model) for configuration data. Likewise, happens in decision to use certain discovery algorithms. For every $x_4$ addition of a CI element, increase a notification score; once a threshold for the notification score is surpassed, the system can alert an administrator with a message that one or more data sources are potentially missing with information about helpful CI's.

It should be understood that the methodologies of embodiments of the invention may be particularly well-suited for determining automating an IT configuration analysis.

Figure 6:
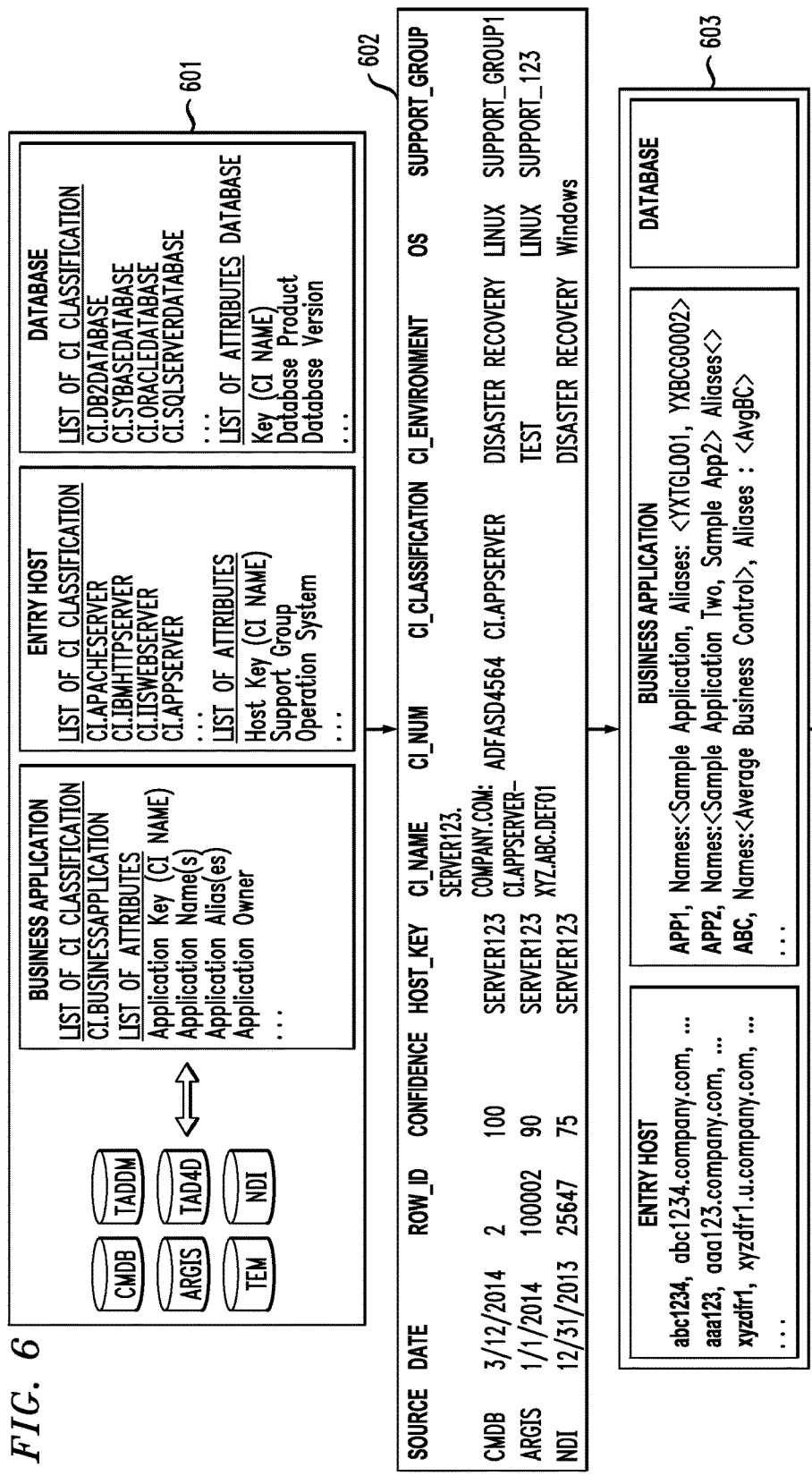
FIG. 6 and FIG. 7 are a flow diagram of a business application model creation method according to an exemplary embodiment of the present invention.
Figure 7:
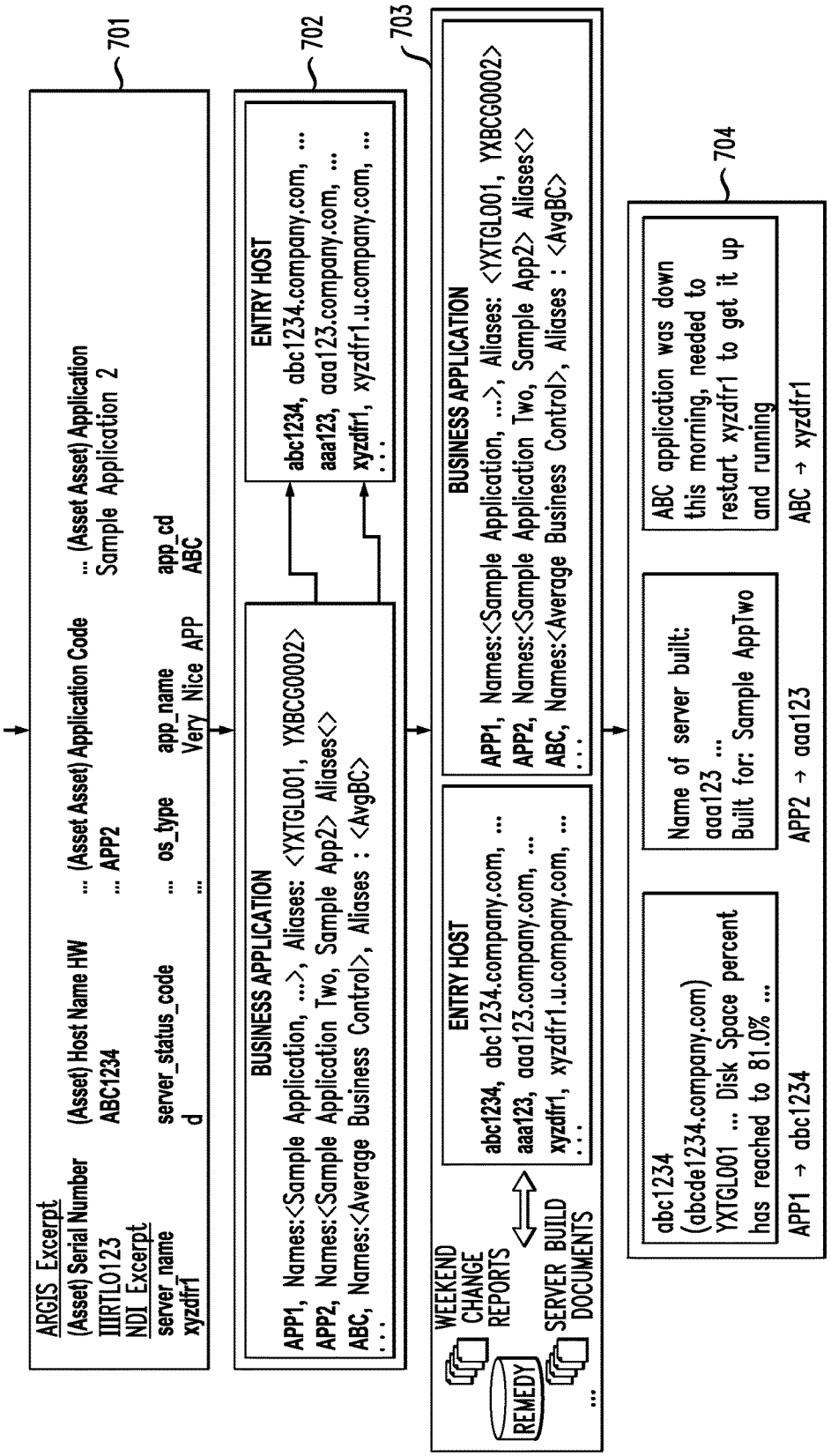

By way of recapitulation, according to an exemplary embodiment of the present invention, a method for automating an IT configuration analysis (see FIG. 6 and FIG. 7) includes extracting configuration item information for configuration item types of interest from structured data sources at 601 and outputting the collected information for entry hosts at 602. At block 603 the collected information is consolidated for all unique configuration item elements. At blocks 701-702 the relationships expressed in the collected information from the structured data sources are discovered. At blocks 703-704 unstructured data is analyzed and relationships expressed by the unstructured data are discovered, e.g., by text analysis.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a system for feedback collection and analysis. Further, a computer program product can include a tangible computer-readable recordable storage medium with code adapted to be executed to carry out one or more method steps described herein, including the provision of the system with the distinct software modules.

Figure 8:
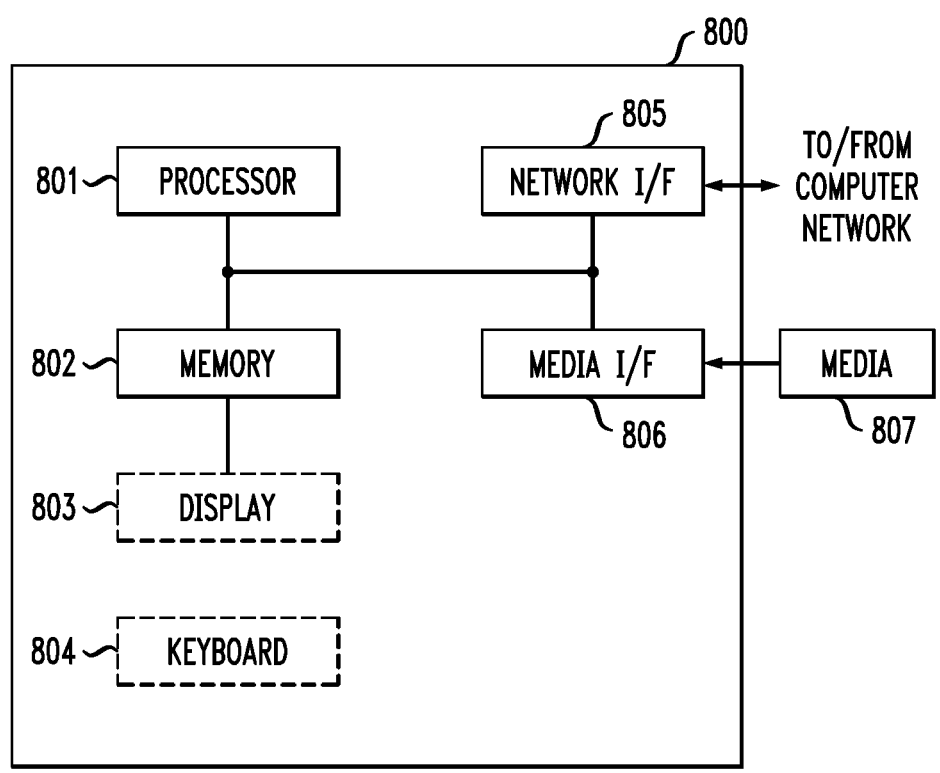
FIG. 8 is a diagram of a computer system configured for feedback collection and analysis according to an exemplary embodiment of the present invention.

Referring to FIG. 8; FIG. 8 is a block diagram depicting an exemplary computer system 800 for feedback collection and analysis according to an embodiment of the present invention. The computer system shown in FIG. 8 includes a processor 801, memory 802, display 803, input device 804 (e.g., keyboard), a network interface (I/F) 805, a media IF 806, and media 807, such as a signal source, e.g., camera, Hard Drive (HD), external memory device, etc.

In different applications, some of the components shown in FIG. 8 can be omitted. The whole system shown in FIG. 8 is controlled by computer readable instructions, which are generally stored in the media 807. The software can be downloaded from a network (not shown in the figures), stored in the media 807. Alternatively, software downloaded from a network can be loaded into the memory 802 and executed by the processor 801 so as to complete the function determined by the software.

The processor 801 may be configured to perform one or more methodologies described in the present disclosure, illustrative embodiments of which are shown in the above figures and described herein. Embodiments of the present invention can be implemented as a routine that is stored in memory 802 and executed by the processor 801 to process the signal from the media 807. As such, the computer system is a general-purpose computer system that becomes a specific purpose computer system when executing routines of the present disclosure.

Although the computer system described in FIG. 8 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A non-transitory computer-readable recordable storage medium storing code executed by a processor causing the processor to perform an automated data collection method comprising:
    collecting, by a configuration collector manager, a default set of configuration data of an information technology infrastructure, including configuration properties, from a plurality of data sources forming the information technology infrastructure, wherein each of the data sources has a score and wherein the data sources provide the default set of configuration data responsive to a command received from the configuration collector manager;
    creating, by a model discovery component, a business application model using the default set of configuration data collected by the configuration collector manager, wherein the business application model comprises a set of unique elements of the information technology infrastructure and relationships therebetween;
    mapping the data sources providing the default set of configuration data to the unique elements of the information technology infrastructure;
    collecting, from a business application model analysis user interface, activity, including edits and confirmations, associated with the business application model and records associating a plurality of editors with the activity;
    analyzing, by a feedback analyzer component, the activity associated with the business application model and the records associating the editors with the activity, wherein the analysis comprises:
        identifying a first group of the editors using the records associating the editors with the activity;
        mapping the activity of the first group to the data sources;
        increasing the score of each of the data sources mapped to the activity associated with the first group of the editors;
        decreasing the score of each of the data sources not mapped to the activity associated with the first group of the editors; and
        prioritizing the configuration properties based on the scores of the data sources; and
    scanning, periodically by the configuration collector manager, the information technology infrastructure to collect additional configuration data according to the prioritized configuration properties, wherein a frequency of the scanning of any one of the plurality of data sources forming the information technology infrastructure is individually adjusted according to the prioritized configuration properties, and wherein the collection of the additional configuration data is performed using an instruction of the configuration collector manager to the data sources overriding the command to collect the default set of configuration data.

2. The computer-readable recordable storage of claim 1, wherein the data collection method further comprises storing, by a business application model repository, the business application model, the activity.

3. The computer-readable recordable storage of claim 1, wherein the data collection method further comprises mapping, by a configuration interpreter, the configuration properties collected by the configuration collector manager to a plurality of configuration properties of the business application model, wherein the feedback analyzer component determines which of the plurality of data sources contribute to corresponding ones of the configuration properties of the business application model.

4. The computer-readable recordable storage of claim 3, wherein the data collection method further comprises storing, by a business application model repository, the mapping of the configuration properties collected by the configuration collector manager to the plurality of configuration properties of the business application model.

5. The computer-readable recordable storage of claim 1, wherein the data collection method further comprises:
    discovering, by the feedback analyzer component, patterns in the activity of the editors and identifying the first group of editors among the editors according to the patterns; and
    adjusting the collection of the additional configuration data by the configuration collector manager according to the activity of the first group of editors.

6. The computer-readable recordable storage of claim 5, wherein the data collection method further comprises:
    discovering, by the feedback analyzer component, patterns in the plurality of data sources according to the patterns; and
    adjusting the collection of the additional configuration data by the configuration collector manager according the patterns in the plurality of data sources.

7. The computer-readable recordable storage of claim 1, wherein the business application model is stored in a memory as a graph comprising a plurality of vertices and a plurality of edges, each vertex representing a configuration item (CI) associated with at least one of the configuration properties and each edge connecting a pair of CI's and representing a relationship between the connected CIs.

8. A computer program product for data collection, the computer program product comprising a computer readable storage medium having program instructions embodied therewith, the program instructions executable by a processor to cause the processor to perform a method comprising:

collecting, by a configuration collector manager module, a default set of configuration data of an information technology infrastructure, including configuration properties, from a plurality of data sources forming the information technology infrastructure, wherein each of the data sources has a score and wherein the data sources provide the default set of configuration data responsive to a command received from the configuration collector manager;

creating, by a model discovery module, a business application model using the default set of configuration data collected by the configuration collector manager, wherein the business application model comprises a set of unique elements of the information technology infrastructure and relationships therebetween;

mapping the data sources providing the default set of configuration data to the unique elements of the information technology infrastructure;

collecting, from a business application model analysis user interface module, activity associated with the business application model and records associating a plurality of editors with the activity;

analyzing, by a feedback analyzer module, the activity associated with the business application model and the records associating the editors with the activity, wherein the analysis comprises:

identifying a first group of editors among the editors using the records associating the editors with the activity;

mapping the activity of the first group of editors to the data sources;

increasing the score of each of the data sources mapped to the activity associated with the first group of editors;

decreasing the score of each of the data sources not mapped to the activity associated with the first group of editors; and prioritizing the configuration properties based on the scores of the data sources; and scanning, periodically by the configuration collector manager, the information technology infrastructure to collect additional configuration data according to the prioritized configuration properties, wherein a frequency of the scanning of any one of the plurality of data sources forming the information technology infrastructure is individually adjusted according to the prioritized configuration properties, and wherein the collection of the additional configuration data is performed using an instruction of the configuration collector manager to the data sources overriding the command to collect the default set of configuration data.

9. The computer program product of claim 8, further comprising storing, by a business application model repository, the business application model, the activity including edits and confirmations.

10. The computer program product of claim 8, further comprising mapping, by a configuration interpreter, the configuration properties collected by the configuration collector manager to a plurality of configuration properties of the business application model, wherein the feedback analyzer module determines which of the plurality of data sources contribute to corresponding ones of the configuration properties of the business application model.

11. The computer program product of claim 10, further comprising storing, by a business application model repository, the mapping of the configuration properties collected by the configuration collector manager to the plurality of configuration properties of the business application model.

12. The computer program product of claim 8, further comprising:

discovering, by the feedback analyzer module, patterns in the activity of the editors who provided the activity in connection with a plurality of business applications models, including the business application model, and identifying the first group of editors associated with the business application model among the editors and the business application models according to the patterns in the activity; and adjusting the collection of the additional configuration data by the configuration collector manager according to the activity of the first group of editors.

13. The computer program product of claim 12, further comprising:

discovering, by the feedback analyzer module, patterns in the plurality of data sources according to the patterns; and adjusting the collection of the additional configuration data by the configuration collector manager according the patterns in the plurality of data sources.

14. The computer program product of claim 8, wherein the business application model is stored in a memory as a graph comprising a plurality of vertices and a plurality of edges, each vertex representing a configuration item (CI) associated with at least one of the configuration properties and each edge connecting a pair of CI's and representing a relationship between the connected CIs.

* * * * *